United States Patent
Miyori

(10) Patent No.: US 7,076,414 B2
(45) Date of Patent: Jul. 11, 2006

(54) GAS FLOW SIMULATION METHOD

(75) Inventor: Akio Miyori, Hyogo (JP)

(73) Assignee: SRI Sports Limited, Kobe (JP)

( * ) Notice: Subject to any disclaimer, the term of this patent is extended or adjusted under 35 U.S.C. 154(b) by 889 days.

(21) Appl. No.: 10/054,788

(22) Filed: Jan. 25, 2002

(65) Prior Publication Data

US 2002/0147573 A1    Oct. 10, 2002

(30) Foreign Application Priority Data

Feb. 26, 2001    (JP) .............................. 2001-050071

(51) Int. Cl.
*G06G 7/50* (2006.01)
(52) U.S. Cl. .......................................... 703/9; 700/282
(58) Field of Classification Search .................. 703/9; 345/419; 700/282
See application file for complete search history.

(56) References Cited

U.S. PATENT DOCUMENTS

| | | | |
|---|---|---|---|
| 5,537,641 A * | 7/1996 | da Vitoria Lobo et al. | 345/419 |
| 6,089,744 A * | 7/2000 | Chen et al. | 703/2 |
| 6,096,088 A * | 8/2000 | Yu et al. | 703/9 |
| 6,336,085 B1 * | 1/2002 | Ueda et al. | 703/9 |
| 6,928,399 B1 * | 8/2005 | Watts et al. | 703/2 |

FOREIGN PATENT DOCUMENTS

JP          06-194242 A     7/1994

* cited by examiner

*Primary Examiner*—Albert W. Paladini
(74) *Attorney, Agent, or Firm*—Birch, Stewart, Kolasch & Birch, LLP

(57) ABSTRACT

An object having a concavity on a surface thereof is formed by means of a computer. A part of the surface of the object including the concavity is extracted. A spatial part in contact with the extracted surface of the object is formed by dividing the extracted surface of the spatial part into blocks. A large number of lattice-shaped portions is formed by dividing the spatial part into lattices. In a simulation, a gas is flowed into the spatial part in one direction. The motion of the gas is computed discretely for each lattice-shaped portion at each slight time by the equation of continuity and the Navier-Stokes equation. Based on results of the computation, the motion of the gas is visualized by a visualizing program.

22 Claims, 14 Drawing Sheets

○ indicates that speed is zero
● indicates that speed is deterined by computation Prior Art

GAS FLOW SIMULATION METHOD

BACKGROUND OF THE INVENTION

1. Field of the Invention

The present invention relates to a gas flow simulation method. More particularly, the present invention relates to a gas flow simulation method for simulating and visualizing the motion situation of a gas flow to check how a concavity formed on the surface of an object flying in a space affects the flow of a gas on the periphery of the concavity.

2. Description of the Related Art

To analyze the aerodynamic characteristic of many kinds of spheres such as a golf ball, a baseball ball, and the like, many kinds of apparatuses and methods have been proposed. In particular, in the case of the golf ball, a large number of dimples (concavities) formed on the surface thereof affect its aerodynamic characteristic greatly. Thus it is important to recognize the casual relation between the aerodynamic characteristic of the golf ball and the size, arrangement, and combination of the dimples.

To evaluate how the flight characteristic of the golf ball changes owing to the difference in the size, arrangement, and combination of the dimples formed on the surface of the golf ball, golf balls having different dimple specifications are made on an experimental basis and experiments of hitting the golf balls thus made are conducted to measure flight distances thereof and the like. In recent years, instead of the ball-hitting experiments, there are proposed methods of analyzing the aerodynamic characteristic of the golf ball placed in a wind tunnel by measuring the lift coefficient and drag coefficient thereof.

FIG. 14 shows the measuring apparatus, disclosed in Japanese Patent Application Laid-Open No. 6-194242, for analyzing the aerodynamic characteristic of the golf ball by utilizing the wind tunnel. In the measuring apparatus 1 placed in the wind tunnel together with the golf ball, the motor 3 rotates the aluminum shaft 2 having the object T such as the to-be-measured golf ball installed on its upper end, and the strain of the aluminum shaft 2 is detected by the strain-type detector 4, for detecting the axial three components of force, disposed on the periphery of the aluminum shaft 2. When the object T is rotated in an air current generated in the wind tunnel, the object T in the wind tunnel has a state pseudo to an actual flight state. The lift coefficient and drag coefficient of the object T are derived from a measured strain amount of the aluminum shaft 2 to analyze the flight characteristic of the object T. In the measurement which is performed by the measuring apparatus 1, air currents of various conditions are generated in the wind tunnel and the aerodynamic characteristic can be measured in various conditions.

The experiment of hitting the golf ball conducted on an experimental basis and the results measured by the measuring apparatus 1 utilizing the wind tunnel relate to the aerodynamic characteristic of the entire golf ball. Thus the measuring apparatus 1 has a problem that it is impossible to analyze in detail. More specifically, it is impossible to analyze how the air current is affected by the configuration, size, and arrangement of individual dimples formed on the surface of the golf ball. That is, in designing the golf ball, it is most important to know how the flow of the gas on the periphery of the dimple is affected by a particular arrangement of a newly added single dimple or a particular arrangement of plurality of newly added dimples. If it is possible to easily and promptly know the influence of each dimple on the air current on the periphery thereof, it is possible to make a golf ball as desired, by reflecting the content of the result obtained by the measurement.

However in the conventional measuring method, how the configuration of each dimple changes the flow of the air on the periphery thereof is unclear and only the resultant characteristic of the changed air current can be determined. That is, the conventional measuring method is incapable of clarifying the casual relation between the newly designed dimple and the aerodynamic characteristic. Therefore in developing the golf ball, many golf balls having different dimple configurations or different dimple arrangements are made on an experimental basis, and measurements as described above are made to merely estimate the influence of individual dimples on the gas flow, based on the aerodynamic characteristic of the entire golf ball. Thus the conventional measuring method is incapable of designing the golf ball efficiently.

Further the effect of the dimple is evaluated based on the estimation obtained from the measurement as described above and numerical values obtained from experience. Thus the conventional measuring method has a problem that the evaluation or the determination of the dimple lack objective accuracy. Therefore the newly designed golf ball is liable to have performance different from the desired performance. In this case, re-design is made to make a golf ball on an experimental basis and check the aerodynamic characteristic thereof. As such, the conventional measuring method has a problem that it takes much time and money to develop a golf ball having dimples newly designed configuration, size or arrangement.

SUMMARY OF THE INVENTION

The present invention has been made in view of the above-described problem. To efficiently develop an object such a golf ball moving in a gas, it is an object of the present invention to analyze how the configuration of a particular range of the surface of the object affects a gas current on the periphery thereof so that the gas current affected thereby can be visually evaluated.

To achieve the object, the present invention provides a gas flow simulation method comprising the steps of forming an object having at least one concavity on a surface thereof by means of a computer and extracting a part of the surface of the object including the concavity; forming a spatial part from a space located on the periphery of the object by dividing a portion of the spatial part in contact with the extracted surface of the object into blocks; forming a large number of lattice-shaped portions by dividing the spatial part into lattices; flowing a gas into the spatial part in one direction along the surface of the object and discharging the gas in a different direction through an inside of the spatial part; computing a motion element of a flow of the gas for each lattice-shaped portion of the spatial part; and simulating a flow of the gas on the periphery of the concavity.

In the method, the object having the concavity corresponding to a dimple of a golf ball and the spatial part including the concavity are formed in an imaginary space of a computer. By performing a simulation of a gas flow which is flowed continuously into the spatial part and discharged continuously therefrom by using the computer, it is possible to analyze not the influence of the entire object but the influence of individual concavities on the gas flow on the periphery of the concavities. That is, in the present invention, to check the change of the gas flow which is made by the individual concavities formed on the surface of the object, only a portion of the surface of the object and the spatial part in contact with the portion of the surface thereof are simulated. Thereby it is possible to accomplish an efficient simulation by reducing the number of elements to be computed. According to the method of the present invention, it is possible to decrease or increase a simulation range appropriately to analyze the change of the air current more locally or on the entire object.

The motion element of the gas flow is a velocity of the gas flow, a direction of the gas flow, and a pressure of the gas flow applied to the surface of the object in each axial direction of a three-dimensional space coordinate system. The motion element is computed at each slight time dt by using the equation of continuity and the Navier-Stokes equation.

As the simulation method which is carried out in the present invention, by discretely using the equation of continuity and the Navier-Stokes equation for each of lattice-shaped portions formed by dividing the spatial part, computations are performed at each slight time dt to find a numerical value of the motion element. Then the gas flow regarding the entire spatial part is simulated by combining results of the computation of the lattice-shaped portions with each other. In this manner, it is possible to analyze the change of the gas flow. In the case where the change of the gas flow with the elapse of time and the gas flow situation in different periods of time are intended to be analyzed, computation of the equations are performed at each slight time. Thereby it is possible to analyze the change of the gas flow in a required period of time.

Based on a result of the computation, a gas flow on the periphery of the concavity is simulated by visualizing a flow direction of the gas flow and a flow velocity thereof by a vector direction and a vector length respectively. Further based on the result of the computation, the gas flow on the periphery of the concavity is simulated by visualizing a pressure distribution of the gas flow by an isobaric line or a surface connecting equal pressures to each other. Further based on the result of the computation, the gas flow on the periphery of the concavity is simulated by visualizing a vorticity distribution of the gas flow by an isopleth of equal vorticities or a surface connecting equal vorticities to each other. It is possible to visualize various kinds of motions of the gas flow by replacing numerical values obtained by the computations with vectors and isobaric line and the like. The visualization allows the concavity-caused change of the gas flow to be clearly apprehended and the casual relation between the concavity and the aerodynamic characteristic to be determined. In addition, based on the result of the computation, the gas flow on the periphery of the concavity is simulated by visualizing a stream line, a trajectory, and a particle trace of the gas flow. In dependence on a purpose, it is possible to visualize various situations corresponding to the numerical values obtained by the computations of the gas flow by storing the numerical values in a dedicated visualizing program or in a general-purpose visualizing software commercially available.

It is conceivable that the gas discharged from the spatial part flows thereinto again, with the state of the discharged gas unchanged. But in the case where the object itself is rotating or the surface of the object itself is curved, the gas may be simulated by appropriately modifying the equation of the discharged gas in conformity to a condition in consideration of these conditions, using the modified equation of the gas as the equation of the gas flowing into the spatial part, and repeating this operation.

Each lattice-shaped portion formed by dividing the spatial part as described above is not limited to a hexahedron, but the lattice-shaped portion may be formed as a polyhedron such as a tetrahedron, a pentahedron and the like or as a combination of polyhedrons of various configurations. As the method of making equations smoothly continuous discrete for each divided lattice-shaped portions, finite difference method, finite volume method, boundary element method or finite element method is used to perform the computation for each of intersections of the lattices, the center of each lattice or the inside point of each lattice-shaped portion.

In the computation for the flow of the gas flowing at a comparatively low speed on the periphery of the concavity, it is possible to handle the gas as an uncompressible gas. Thus the computation can be accomplished by setting the density of the gas to constant. To perform a direct calculation, numerical values may be substituted into the equation of continuity and the Navier-Stokes equation or a velocity value including a turbulent velocity by handling the gas flow as a turbulent model may be substituted thereinto. In these calculations, the velocity of the gas flowing in contact with the surface of the object may be set to zero, supposing that the gas does not slip on the surface of the object. But in the case where the object rotates, the velocity of the gas in contact with the surface of the object may be set to a value equal to a rotating velocity component of the object.

The height of the spatial part with respect to the surface of the object is set to more than 10 times as large as a depth of the concavity nor more than 10000 times as large as the depth thereof. The height of the spatial part with respect to the surface of the object is required to be more than 10 times as large as the depth of the concavity to simulate the influence of the concavity on the gas on the periphery of the concavity. To prevent much time taking in a computation for a range in which the gas flows at a uniform velocity without being affected by the concavity, it is optimum to set the height of the object with respect to the surface of the object to less than 10000 as large as the depth of the concavity. It is possible to achieve the simulation with high accuracy and computing efficiency by setting the height of the spatial part to this range. When the object is a sphere, it is preferable to set the height of the spatial part to less than 100 as large as the diameter of the sphere.

The height of each of the lattice-shaped portions of the spatial part located in a range less than $1/Re^{0.5}$ (Re is Reynolds number, Re=representative velocity×representative length/kinematic viscosity of gas) with respect to the surface of the object is set to not less than $1/(1000 \cdot Re^{0.5})$ nor more than $1/Re^{0.5}$, and the height of each of the lattice-shaped portions located in a range not less than $1/Re^{0.5}$ with respect to the surface of the object is set to not less than $1/Re^{0.5}$.

Because the neighborhood of the surface of the object is the boundary layer between the object and the gas, the flow velocity of the gas changes greatly in the boundary layer. Thus by finely dividing the lattice-shaped portion located below $1/Re^{0.5}$, it is possible to simulate the gas flow minutely and analyze the relationship between the concavity and the change of the flow of the gas in detail. The gas distant from the surface of the object has a small change in its flow velocity. Thus the spatial part is divided into large lattice-shaped portions to reduce the number of times of computation and increase the computation efficiency. Thus it is possible to reduce the period of time required for the simulation. To check the influence of the concavity on the gas flow on the periphery thereof reliably, it is preferable to set the width of each lattice-shaped portion to about not more than ¼ of the width of the concavity (when the concavity is round, its diameter). Because the dimension of the spatial part and that of the lattice-shaped portion are set in a non-dimensional space, numerical values thereof are non-dimensional values and no units are added thereto. But when the simulation of the gas current is performed based on a golf ball, it is necessary to convert the non-dimensional values to dimensional values. Thus evaluation is made by adding an appropriate unit to the non-dimensional values.

In the present invention, the surface of the object is curved, and a flow direction of the gas which flows into the spatial part and discharged therefrom is corrected in conformity to a curvature of the surface of the object. Thus when the simulation method is applied to a sphere or the like, the surface of the object is curved and the gas flow along a curved surface. Therefore it is preferable to compute the component of the gas flow in the direction tangential or normal to the curved surface to flow the gas into the spatial part and discharge it therefrom.

When a more detailed simulation is carried out, a velocity distribution and a turbulent condition of the gas current may be added to the flow of the gas as an inflow condition. Alternatively when the surface of an object in contact with the spatial part through which the gas passes is sufficiently wide, it is possible to set a condition that the inflow velocity of the gas is made uniform and the outflow velocity thereof is made equal to the outflow velocity in a previous period of time. An upper portion of the spatial part distant from the surface of the object is influenced in a lower extent by the concavity. Therefore a realistic simulation can be accomplished by setting the pressure applied to the surface of the object to zero and the inflow and outflow velocity of the gas flow to an equal velocity.

In the present invention, the object is a golf ball, the concavity is a dimple, and a flow of a gas on the periphery of the dimple of the golf ball is simulated. By applying the simulation method of the present invention to the gas flow on the periphery of the dimple formed on the golf ball, simulated results are serviceable for designing the dimple of the golf ball.

The effect of the dimple of the golf ball is to reduce the resistance of the gas to the golf ball by making the boundary layer which is the gas flow on the surface of the golf ball turbulent and moving a separation point of the gas flow rearward from the surface of the golf ball. By simulating and visualizing the gas flow on the periphery of the dimple by the computer, at a look, it is possible to determine the situation of the gas flow inside and outside the dimple and whether the gas flow has become turbulent owing to the effect of the dimple. Therefore whether the size, disposition, and arrangement of dimples newly designed and formed on the golf ball are optimum can be easily evaluated. Consequently it is possible to evaluate the flight performance of the golf ball without making the golf ball on an experimental basis and experiments and eliminate waste of labor for designing the dimple. Thereby speedup of the development of golf ball can be accomplished.

The gas flow simulation method is recorded in the form of a program on a recording medium of a CD, a DVD or the like. Then the program is read from the CD or the DVD by using a general-purpose computer. Thereby the computer can function as the gas flow simulation apparatus.

DETAILED DESCRIPTION OF THE PREFERRED EMBODIMENTS

The embodiments of the present invention will be described below with reference to the drawings.

Figure 1:
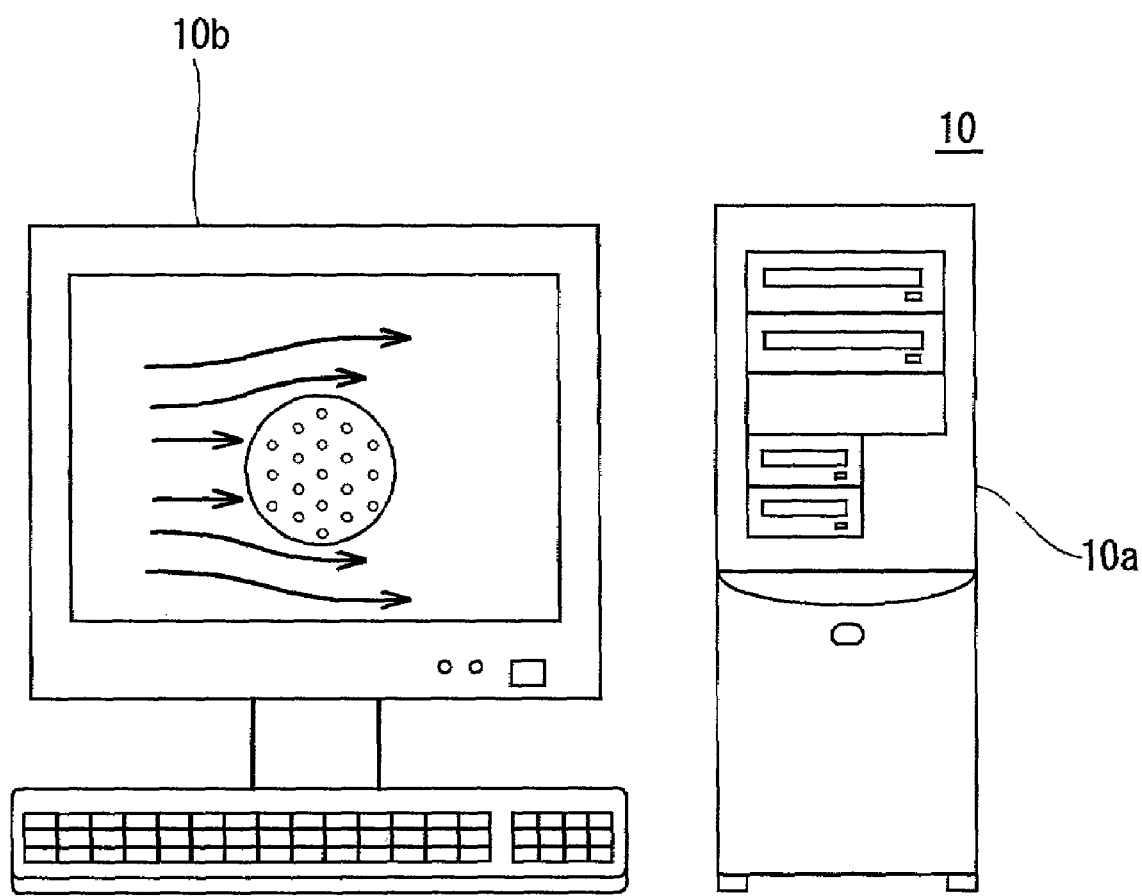
FIG. 1 is a schematic view showing a computer for carrying out the gas flow simulation method of the present invention.

FIG. 1 shows a simulation apparatus 10 according to the gas flow simulation method of the present invention. The simulation apparatus 10 utilizes a computer in a hardware manner. The computer includes a body 10a having a CPU, a memory, and the like and a display 10b. In a software manner, the memory of the body 10a stores a program of the simulation method of the present invention. Various kinds of gas flow simulations can be accomplished by executing the program for simulation.

Figure 2:
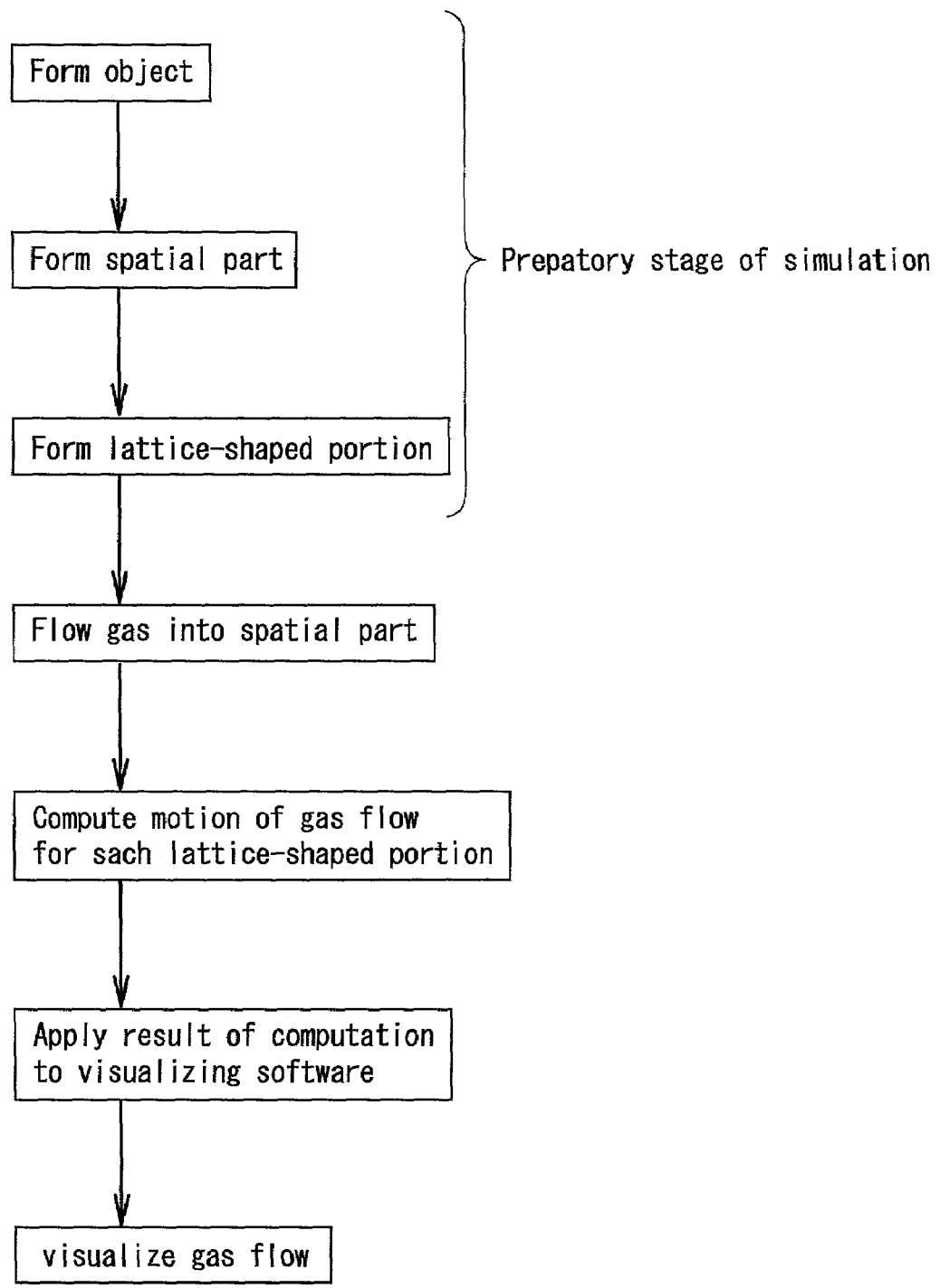
FIG. 2 is a flowchart showing the gas flow simulation method of the present invention.
Figure 3:
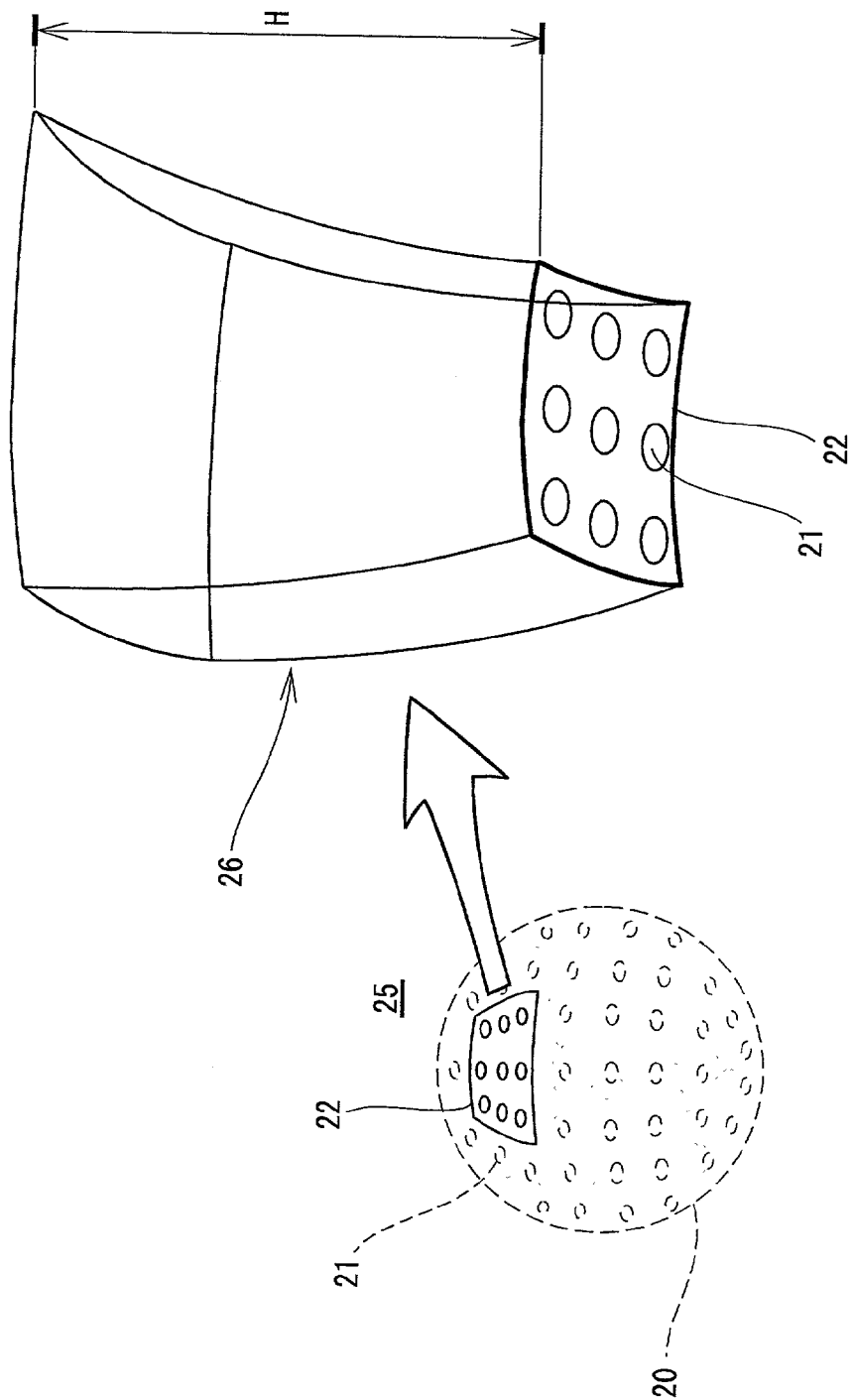
FIG. 3 is a schematic view showing a sphere and a spatial part to be simulated.

FIG. 2 shows the flow of the simulation method of the program stored in the simulation apparatus 10. Initially, as a preparatory stage of the simulation, the simulation apparatus 10 forms a sphere 20 three-dimensionally in an imaginary space of the computer as an object to be simulated, by a figure-drawing software included in the program, as shown in FIG. 3. The figure-drawing software is capable of forming objects having configurations of a trigonal pyramid, a quadrangular prism, a cube, and the like in addition to the sphere. The figure-drawing software is also capable of shaping the surface of a formed object into various configurations, for example, an irregular surface.

In the present invention, to simulate the influence of a concavity formed on the surface of the sphere 20 on a gas flow on the periphery of the sphere 20, the sphere 20 having at least one concavity 21 on its surface is prepared, and a region having a certain area and including the concavity 21 is extracted from the surface of the sphere 20. In this manner, a spherical surface 22 to be simulated is formed.

Thereafter, to model the space in which a gas flow is simulated, a spatial part 26 is formed from a space 25 located on the periphery of the sphere 20 by dividing a portion of the spatial part 26 in contact with the extracted surface of the sphere 20 into blocks. In this case, to sufficiently evaluate the state of change of the gas flow which is made by the influence of the concavity 21 formed on the surface of the object in consideration of computing efficiency, a height H of the spatial part 26 is set to more than 10 times as large as the depth of the concavity 21 nor more than 10000 times as large as the depth thereof or less than 100 times as large as the diameter of the sphere 20.

Figure 4:
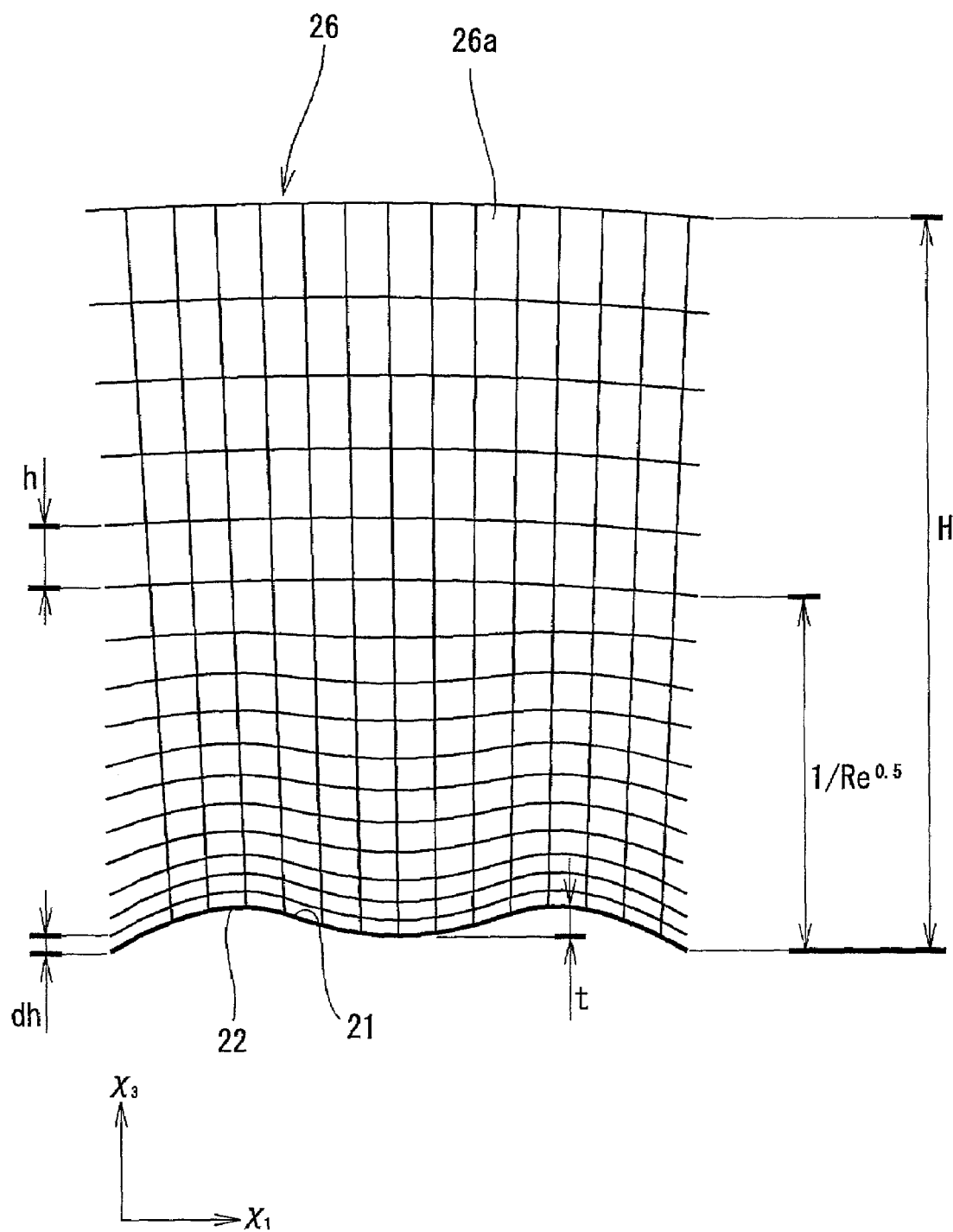
FIG. 4 is a schematic view showing lattice-shaped portions of a spatial part.

As shown in FIG. 4, the spatial part 26 thus formed is divided in the shape of a lattice to form a large number of lattice-shaped portions 26a in such a way as to include the spherical surface 22. The size of the lattice-shaped portion 26a is variably set. For example, the size of a part of each lattice-shaped portion 26a is variably set. Referring to FIG. 4, considering that the gas flow changes greatly in the neighborhood of the spherical surface 22 which is the boundary layer and that in the portion over the spherical surface 22, the gas flow changes in a small extent, the height of the lattice-shaped portion 26a of the neighborhood of the spherical surface 22 is divided finely and increasingly large toward the upper portion of the spatial part 26. More specifically, the height dh of each lattice-shaped portion 26a located in a range less than $1/Re^{0.5}$ (Re is Reynolds number, Re=representative velocity×representative length/kinematic viscosity of gas) with respect to the spherical surface 22 is set to not less than $1/(1000 \cdot Re^{0.5})$ nor more than $1/Re^{0.5}$ in relation to the Reynolds number. The height h of each lattice-shaped portion 26a located in a range not less than $1/Re^{0.5}$ with respect to the spherical surface 22 is set to not less than $1/Re^{0.5}$.

Figure 5:
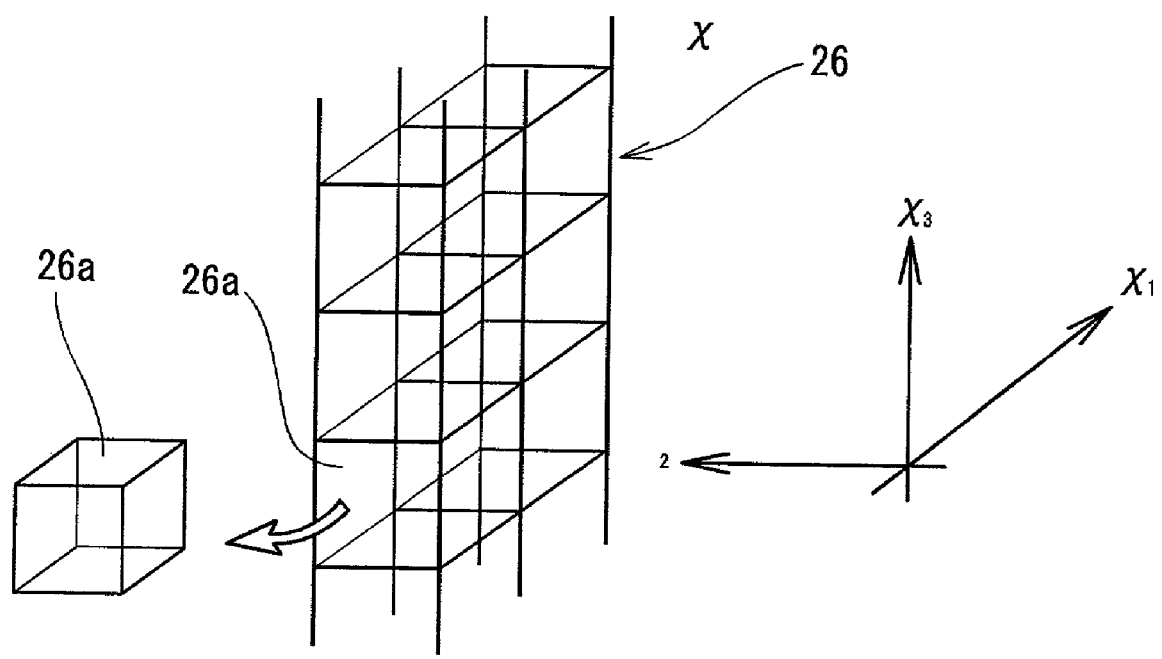
FIG. 5 is a view showing detail of main portions of the lattice-shaped portions of the spatial part.

As shown in FIG. 5, each lattice-shaped portion 26a is formed as a cube which is a hexahedron. To specify the position of the lattice-shaped portion 26a, the direction of the spatial part 26 coincident with a fluid-flowing direction, which will be described later, on a surface (tangential direction) parallel to the spherical surface 22 is denoted as a direction $x_1$, the direction located on the same plane as the direction $x_1$ and orthogonal to the direction $x_1$ is denoted as a direction $x_2$, and the direction vertical to a plane formed by the direction $x_1$ and the direction $x_2$ is denoted as a direction $x_3$.

Figure 6A:
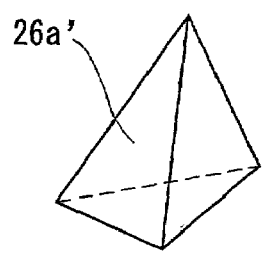
FIGS. 6A, 6B, and 6C are schematic views showing the configuration of a lattice-shaped portion of each of modification.
Figure 6B:
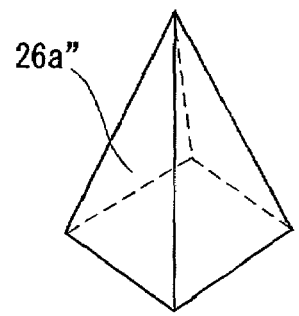
Figure 6C:
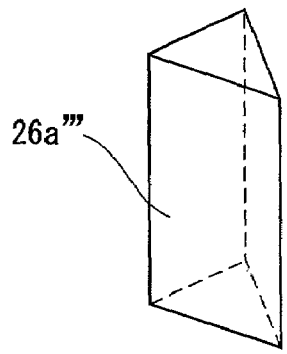
Figure 6D:
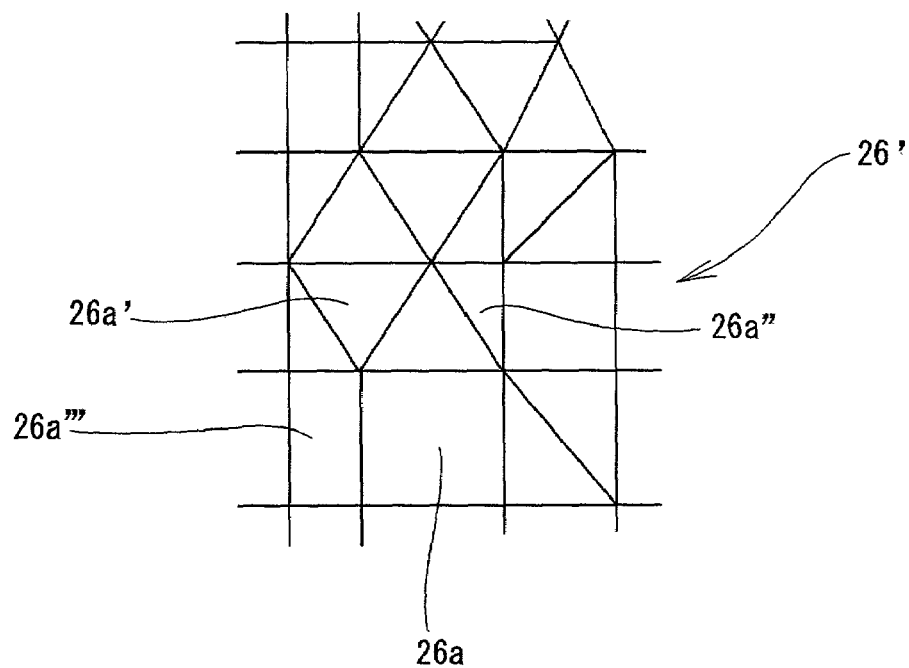
FIG. 6D is a schematic view showing a lattice-shaped portion of a modification in the spatial part.

In addition to the hexahedron, the lattice-shaped portion 26a can be shaped as a trigonal pyramid, a quadrangular pyramid, a trigonal prism as shown by 26', 26a'', and 26a''' in FIGS. 6A, 6B, and 6C respectively. Further a spatial part 26' formed by combining these configurations with each other can be divided, as shown in FIG. 6D. How to divide the spatial part into lattices of many configurations is appropriately determined in consideration of the configuration and condition of an object to be simulated.

Figure 7:
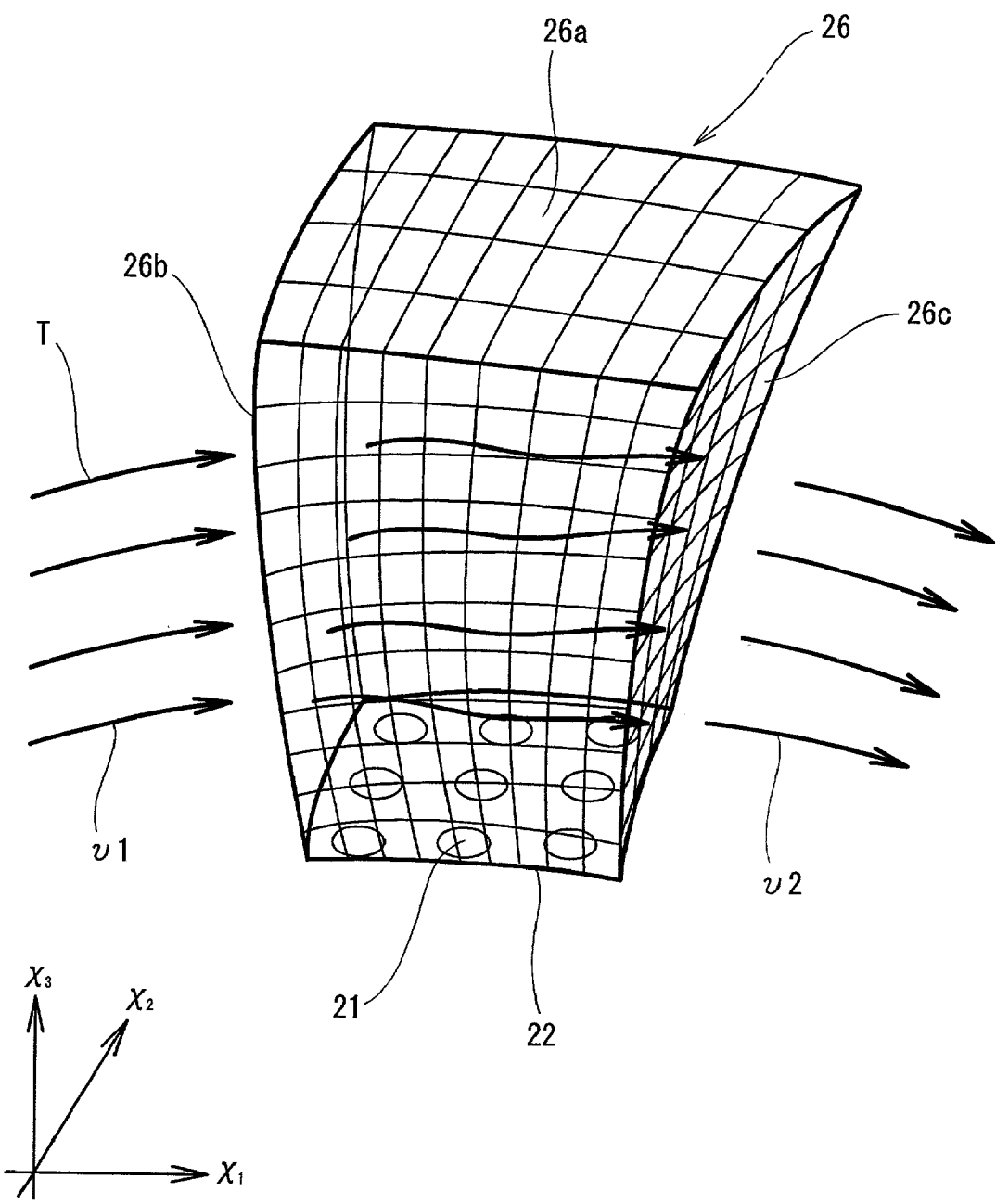
FIG. 7 is a schematic view showing the situation of a gas flow in the spatial part.

As described above, according to the simulation program, as shown in FIG. 7, after the spatial part 26 and the lattice-shaped portion 26a are modeled, a gas (air) T is flowed into the spatial part 26 from one surface 26b thereof along the spherical surface 22, passed through the spatial part 26, and discharged from other surface 26c thereof. The motion regarding the flow of the gas T is expressed by the equation of continuity (1), shown below, equivalent to the law of conservation of mass of the motion of an object and the Navier-Stokes equation (2), shown below, equivalent to the law of conservation of momentum of the motion of the object.

[Equation 1]

$$\frac{\partial p}{\partial t} + \frac{\partial}{\partial x_i}(\rho v_i) = 0 \quad (1)$$

$$\frac{\partial}{\partial t}(\rho v_i) + \frac{\partial}{\partial x_j}(\rho v_i v_j) = \frac{\partial}{\partial x_j} P_{ij} + \rho K_i \quad (2)$$

In the equations (1) and (2) expressed in a tensor form respectively, $\rho$ is the density of a gas, v is its velocity, K is an external force applied to a unit mass of the gas, P is a stress tensor applied to the gas, and t is time. The external force K corresponds to a gravitational force and a buoyancy. The stress tensor P corresponds to a pressure applied to the surface of the object and a shearing component. $P_{ij}$(i,j=1,2,3) can be expressed by an equation (3) which is a matrix having three rows and three columns and which uses nine numbers in a three-dimensional coordinate system of $x_1$, $x_2$, and $x_3$.

$$P_{11} \ P_{12} \ P_{13}$$
$$P_{21} \ P_{22} \ P_{23}$$
$$P_{31} \ P_{32} \ P_{33} \quad (3)$$

In the simulation in which the gas(air) T is successively flowed on the periphery of the object, the flow of gas is simulated by a computation for each lattice-shaped portion 26a of the spatial part 26. The equations (1) and (2) are used for the computation. The computation is performed by making the equations (1) and (2) discrete from each other in correspondence to the division of the spatial part 26 into the lattice-shaped portions 26a. The simulation method is carried out by finite difference method, finite volume method, boundary element method or finite element method appropriately selected in consideration of the condition of the simulation.

In the case where the finite difference method is used to perform the computation by using the discrete two equations, the computation is made sequentially at each slight time dt for each of intersection points of the lattice-shaped portions 26a to find the motion element of the flow of the gas, namely, the velocity of the gas, the flow direction thereof, and the pressure of the gas applied to the object surface at a particular time. By combining results of the computation of the intersection points with each other, it is possible to express the motion regarding the flow of the gas for the entire spatial part 26 as a numerical value. Thereafter computations similar to that described above are performed at each slight time dt to express the motion of the gas flow at each period of time as a numerical value. So long as the computation is performed at each of the intersection points of the lattice-shaped portions 26a, the computation may be performed at the center of each lattice-shaped portion 26a or on the surface of the lattice.

Each numerical value regarding the motion of the gas flow obtained in the above-described manner is displayed visually by using a special-purpose or general-purpose visualizing software to determine the result of the simulation. In the visualization, only the direction and magnitude of the velocity are shown by a vector to display the velocity of the gas on the surface and on the periphery of the object or a pressure distribution is shown by an isobaric line or an isobaric surface connecting equal pressures applied to the object surface to visually display various elements of the gas flow. How the configuration of the object surface or the like affects the gas flow on the periphery of thereof is visualized in this manner to allow the visualization to be serviceable for the design of the configuration of the object surface.

The above-described gas flow simulation method can be modified in various forms in conformity to the condition or the like of the simulation. For example, the equations (1) and (2) expressing the gas flow may be applicable in the form of integration equations (4) and (5), as shown below. In the case where a turbulent model is used as the gas flow, in the equations (1), (2), (4), and (5), it is possible to perform a computation by using v+v' which is the sum of the velocity v of the gas and a turbulent velocity v' of a turbulent component as a velocity component.

[Equation 2]

$$\iiint_y \left( \frac{\partial p}{\partial t} + \frac{\partial}{\partial x_i}(\rho v_i) \right) dV = 0 \quad (4)$$

$$\iiint_v \left( \frac{\partial}{\partial t}(\rho v_i) + \frac{\partial}{\partial x_i}(\rho v_i v_j) - \frac{\partial}{\partial x_j} P_{ij} - \rho K_i \right) dV = 0 \quad (5)$$

Normally, the velocity v of the gas flow, along the spherical surface 22 of the sphere, which is the boundary condition of the gas flow is zero, supposing that the gas does not slip on the surface of the sphere. But in the case where the gas flow on the periphery of a rotating object is the condition of the simulation, a computation may be performed by using the addition of the gas velocity v and a rotational velocity component v'' of the spherical surface 22 of the sphere as the velocity component in consideration of the rotational velocity component v'' of the sphere. In addition to the above-described repetition condition, in the case where the surface of the object is curved like the spherical surface 22, the velocity of the gas flowing into the spatial part 26 and that of the gas discharged therefrom may be set in consideration of the velocity component in the direction tangential to the curved surface.

The above-described gas flow simulation method will be described below in detail by taking the case in which the change of the gas flow which is caused by dimples formed on the surface of a golf ball is simulated as an experimental example.

In the experimental example, a simulation is made on the situation of the gas flow when the golf ball flies in the air at a velocity V of 30 m/s.

As shown in FIG. 3, the simulation apparatus 10 formed a sphere 20 corresponding to a golf ball to be simulated. In the experimental example, the diameter of the sphere 20 was set to 42.5 mm. A large number of approximately hemispherical concavities 21 corresponding to dimples were formed on the surface of the sphere 20. The diameter and depth t of each concavity 21 were 3.145 mm and 0.24225 mm respectively. In this experiment, nine concavities 21 were formed in the range of 1.2875 cm×1.2875 cm on the surface of the sphere 20.

Thereafter the spherical surface 22 was cut from the sphere 20 and extracted therefrom in such a way that nine concavities 21 were formed in the range of 1.2875 cm×1.2875 cm on the surface of the sphere 20. The spatial part 26 in contact with the extracted spherical surface 22 was formed from the space 25 present on the periphery of the sphere 20 by dividing the spatial part 26 into blocks, as shown in FIG. 4. The height H of the spatial part 26 was set to 425 mm which was about 1754 times as large as the depth t of the concavity 21 and which was 10 times as large as the diameter of the sphere 20 so that the spatial part 26 includes a portion in which the flow of the gas was uniform.

As shown in FIG. 7, lattice-shaped divisions 26a were formed by dividing the spatial part 26 including the spherical surface 22 into lattices. The height dh of the lattice-shaped portion 26a immediately over the spherical surface 22 shown in FIG. 4 was set to $1/(10 \cdot Re^{0.5})$. In the range from the spherical surface 22 to a location apart by $1/Re^{0.5}$ from the spherical surface 22, the height dh of the lattice-shaped portion 26a was gradually increased to not more than $1/Re^{0.5}$.

The height dh of each lattice-shaped portion 26a is a non-dimensional value. The size of the non-dimensional value dh replaced by a numerical value in a dimensional space is obtained as follows: That is, the Reynolds number Re (Re=V·D/v) is $8.49 \times 10^4$ in the case where the kinematic viscosity v of the air is set to $15.01 \times 10^{-6}$ m²/s, the representative length D is set to the diameter 42.5 mm of the golf ball, and the ball velocity which is the representative velocity V is set to 30 m/s. The height dh of the lattice-shaped portion 26a immediately over the spherical surface 22 is set to a dimension corresponding to $1.45859 \times 10^{-2}$ mm which is the product of $1/10Re^{0.5}$ and the representative length D.

In the range from the spherical surface 22 to a position located above $1/10Re^{0.5}$, the height h of the lattice-shaped portion 26a is set more than $1/(10 \cdot Re^{0.5})$ in such a way that the height h of the lattice-shaped portion 26a becomes gradually larger upward. In the case where the height h of the lattice-shaped portion 26a is replaced by a numerical value in the dimensional space, the maximum value of the height h has a dimension corresponding to 100 mm. In the case where the lattice-shaped portion 26a located above the spherical surface 22 by more than $1/(10 \cdot Re^{0.5})$ exceeds a predetermined dimension, the heights of the lattice-shaped portions 26a disposed at higher positions are set equally to a predetermined dimension to facilitate computations. The length of the lattice-shaped portion 26a in the directions $x_1$ and $x_2$ is set to ⅛ of the diameter of the concavity 21 to precisely determine the change of the gas flow inside the concavity 21.

In the state in which the object to be simulated was modeled as described above, as shown in FIG. 7, the gas T was flowed into the spatial part 26 from one surface 26b thereof along the spherical surface 22, passed through the spatial part 26, and discharged from other surface 26c thereof. The inflow velocity $v_1$ of the gas T was set to 30 m/s to perform a simulation in the condition that the velocity V of the sphere 20 was 30 m/s. Thereby a situation similar to the situation in which the sphere 20 flies at this velocity was created.

Figure 8:
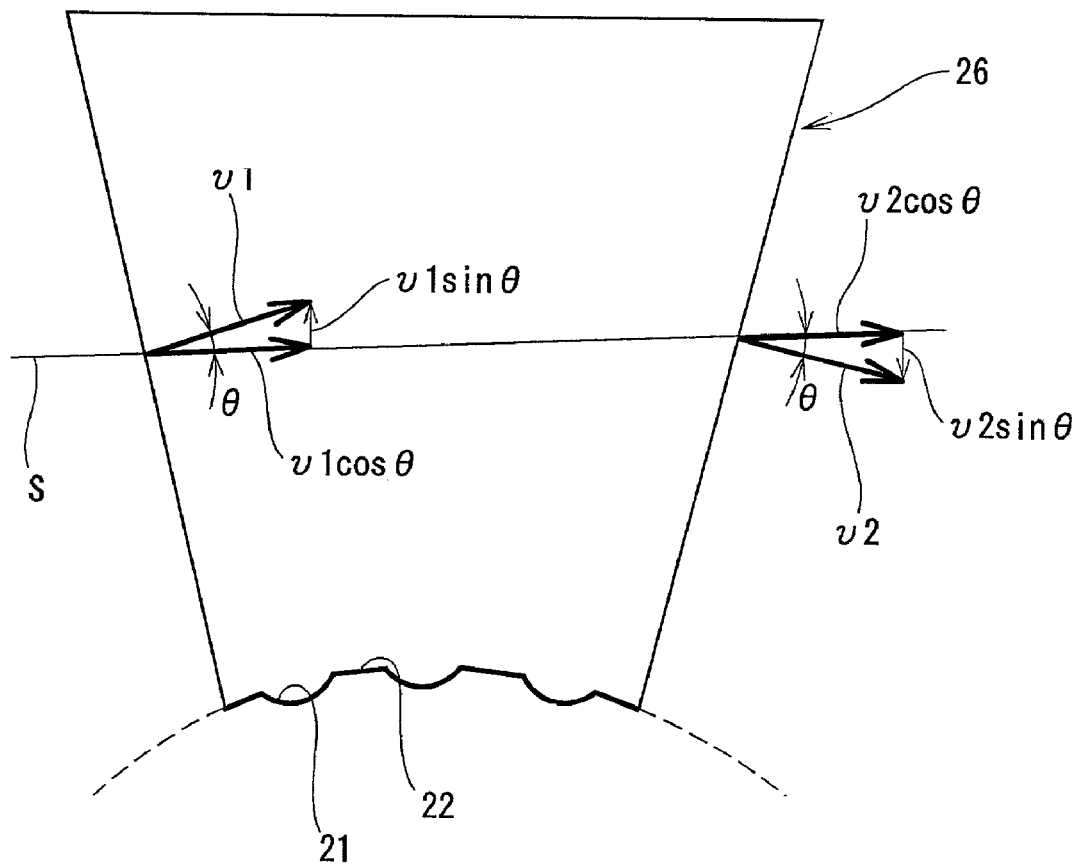
FIG. 8 is a schematic view showing a velocity component of a gas flow in each direction.

In the experiment, the outflow velocity $v_2$ and the inflow velocity $v_1$ are set to an equal value. Because the spherical surface 22 is the curved surface, the velocity direction of the inflow velocity $v_1$ and the outflow velocity $v_2$ are set to the direction tangential to the spherical surface 22. That is, as shown in FIG. 8, supposing that the inflow velocity $v_1$ and the outflow velocity $v_2$ intersect a horizontal line S at an angle of θ, the curvature of the spherical surface 22 was considered to establish the following relationship:

$$|v_1|\sin\theta = -|v_2|\sin\theta \quad (6)$$

$$|v_1|\cos\theta = |v_2|\cos\theta \quad (7)$$

The gas T was regarded as an uncompressible gas. The density ρ of the gas T was set to a constant value. The pressure of the spatial part 26 at its upper portion was set to zero. The gas T did not slip on the spherical surface 22. The velocity component on the spherical surface 22 was set to zero.

Figure 9:
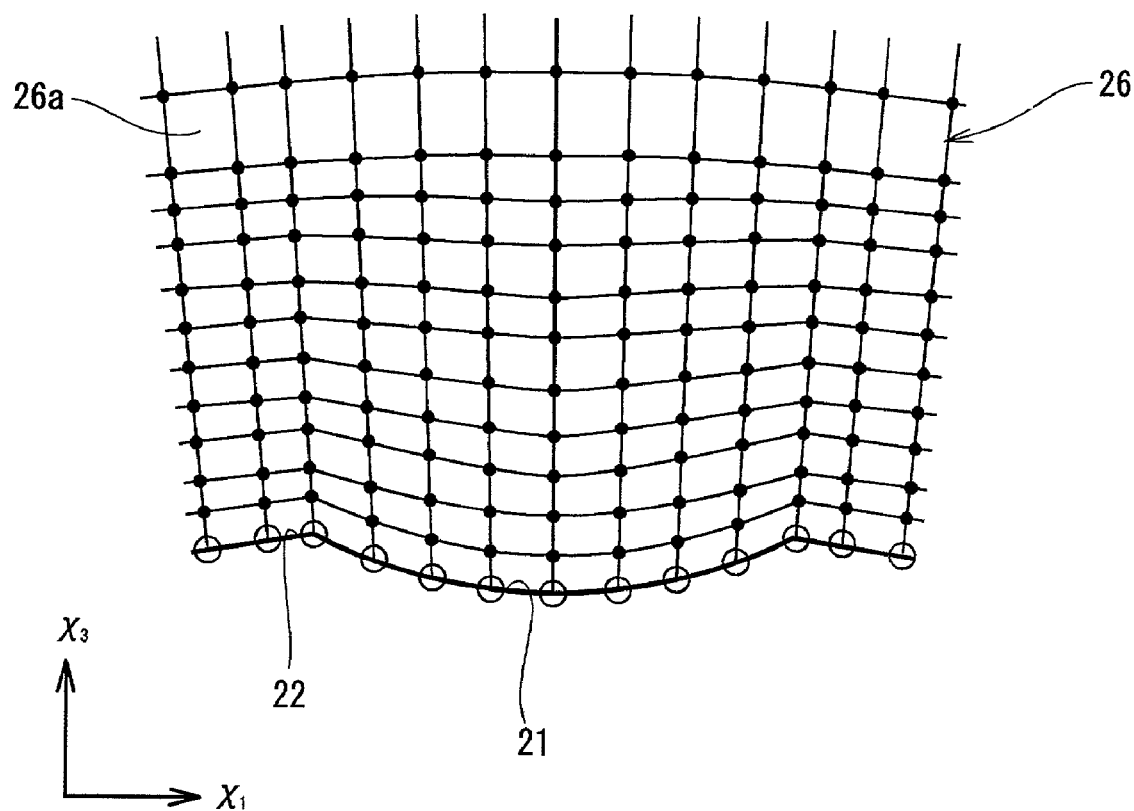
FIG. 9 is a schematic view showing intersection points of lattice-shaped portions on which a computation is performed by finite difference method.

The flow of the gas T is continuous from the one surface 26*b* of the spatial part 26 to the other surface 26*c* thereof. Using the discrete equations (1) and (2), the motion elements of the gas T, namely, its flow velocity, its flow direction, and its pressure applied to the spherical surface 22 are computed. The computation is performed by the finite difference method. As shown in FIG. 9, the above-described values and the values of intersection points (shown with ● in FIG. 9) of the lattice-shaped portions 26*a* in the coordinates $x_1$, $x_2$, and $x_3$ are substituted into the discrete equations (1) and (2) except the intersection points (shown with ○ in FIG. 9) of the lattice-shaped portions 26*a* and the spherical surface 22. Thereafter computations are performed at each slight time dt to determine the value of each motion element of the entire spatial part 26. Thereafter computations are performed at each slight time dt to determine the value of each motion element of the air T in each period of time.

Figure 10:
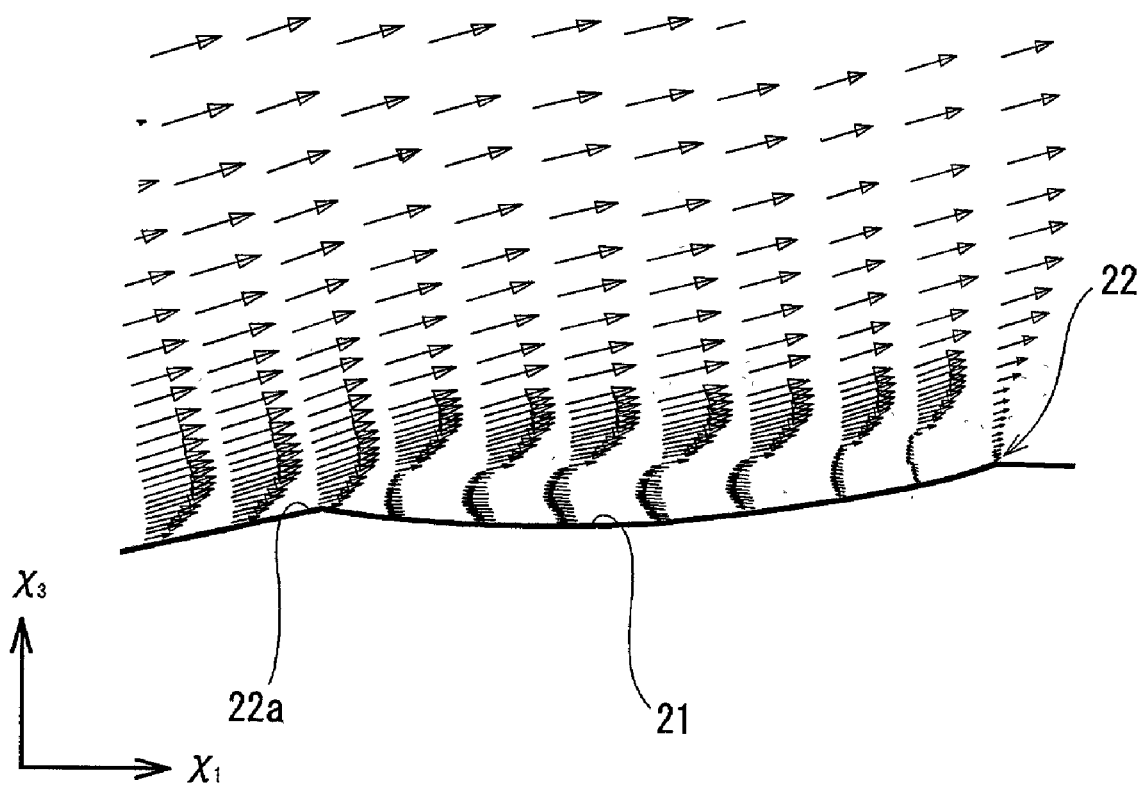
FIG. 10 is a visual view showing a speed and direction of the gas.

Thereafter in the experiment, to visualize the motion of the gas T, the flow situation thereof is visualized by using a visualizing software (FIELD VIEW: manufactured by U.S. Intelligent Light Inc.) commercially available, based on the determined values. FIG. 10 visually shows the flow velocity and direction of the gas T on the periphery of the concavity 21 at a certain time. As the vector, the velocity of the gas T is shown with the length of each arrow, and the direction of the flow of the gas T is shown with the direction of the arrow. Thus it has been found that inside the concavity 21, a gas flow having a slow velocity is generated in a direction opposite to the flow direction of the gas T and that the velocity thereof becomes increasingly high as it becomes distant from the spherical surface. The flow direction of the gas T is made coincident with the velocity direction obtained by the computation of synthesizing the components in the three-dimensional rectangular coordinates.

Figure 11:
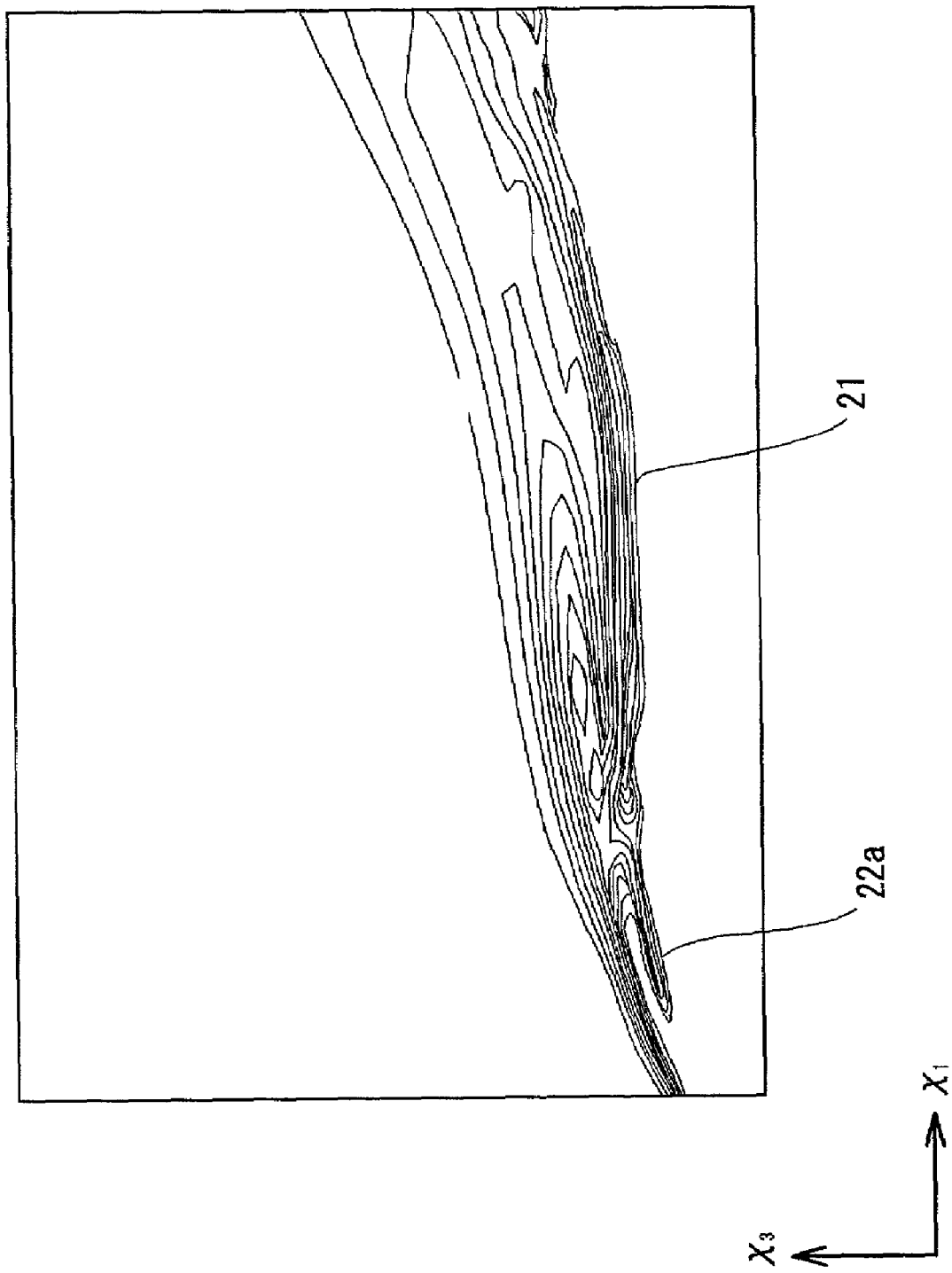
FIG. 11 is a visual view showing a vorticity of the gas.
Figure 12:
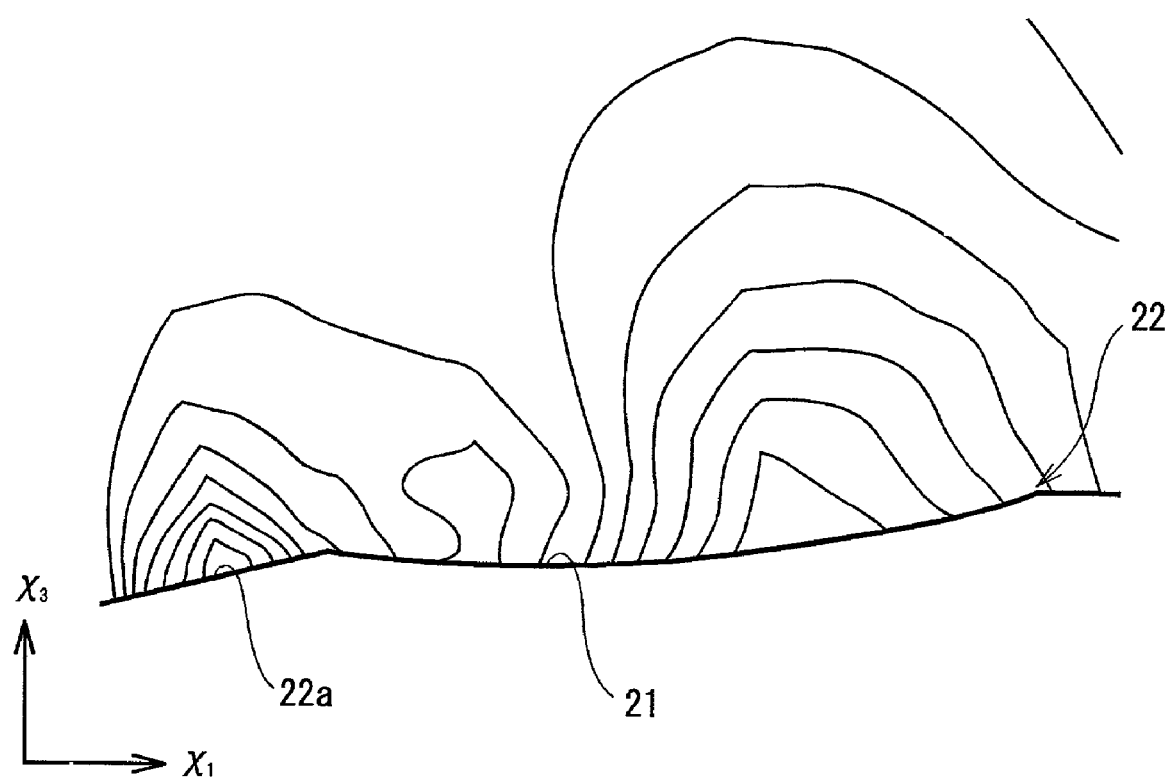
FIG. 12 is a visual view showing an equal pressure distribution of the gas.

FIG. 11 is a sectional view of the periphery of one concavity 21 at a certain time. FIG. 11 shows the distribution situation of the vorticity of an eddy current as an isogram thereof. As shown in FIG. 11, it is understood that long and narrow eddies are generated along a land 22*a* of the spherical surface 22, with the result that turbulent currents are generated at the boundary layer and that eddy currents of a different pattern are generated inside the concavity 21. FIG. 12 shows the pressure distribution of the gas T applied to the surface of one concavity 21 at a certain time. In FIG. 12, portions having an equal pressure are connected with each other with a line to sectionally visually show the pressure distribution of the gas T. FIG. 12 indicates that the pressure changes around the land 22*a* of the spherical surface 22 of the sphere and around the center of the concavity 21 and that in these portions, the interval between adjacent isobaric lines is short and thus the pressure changes greatly. The vorticity distribution and the pressure distribution may be visualized by the isobaric surface connecting equal pressures. In addition, based on computed results, a stream line, a trajectory, and a particle trace can be visualized with a line or classification by coloring.

As described above, the use of the simulation method of the present invention allows evaluation of the dimple-caused state of the gas flow without making a golf ball on an experimental basis. Thus, it is possible to determine how a single dimple or a plurality of dimples affect the flow of the air. It is possible to improve design efficiency by reflecting the determination thus made on the design of the golf ball.

Figure 13:
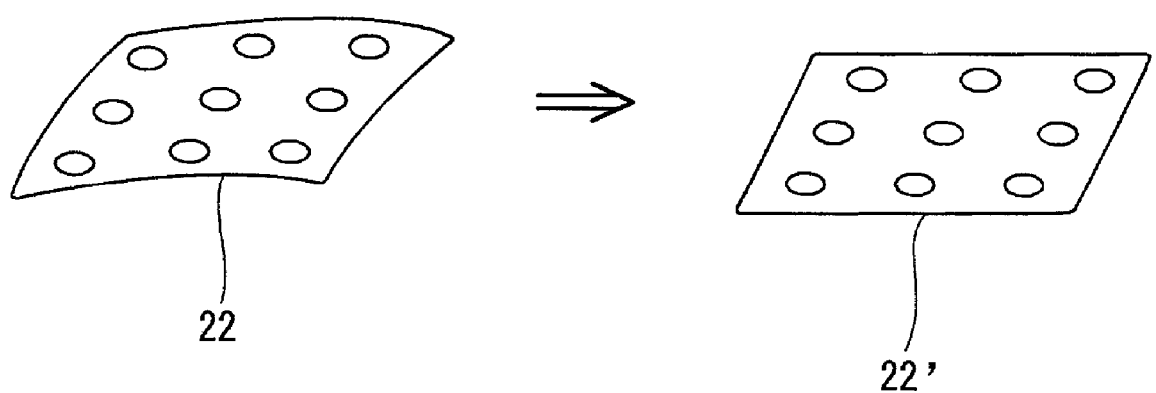
FIG. 13 is a schematic view showing the surface of a sphere in a simple form.
Figure 14:
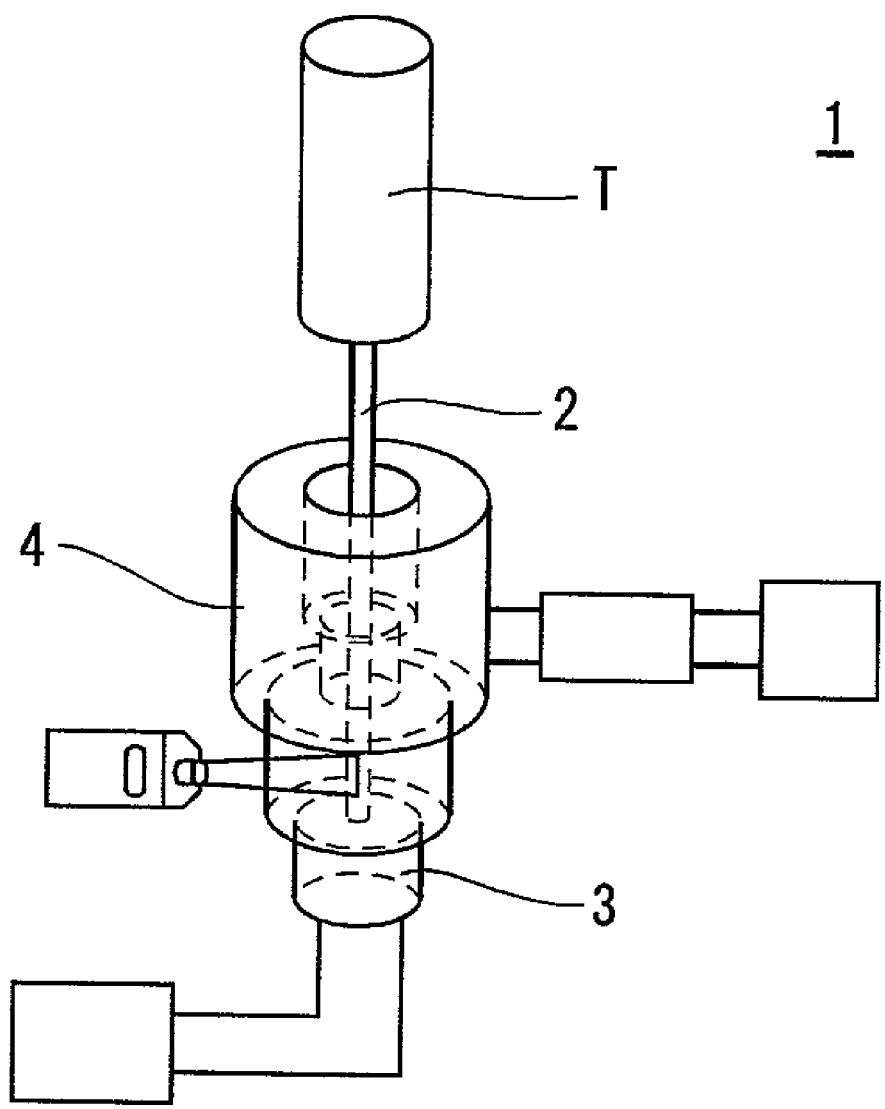
FIG. 14 is a schematic view showing a conventional measuring apparatus.

The present invention is not limited to the above-described embodiments and experiments and allows appropriate increase or decrease of the computing range from one concavity to the entire object entirety. To accomplish the computation efficiently, it is possible to approximate a surface extracted from the sphere to a plane. In the case where the rotating sphere is simulated, the computation may be performed by not making the velocity of the spherical surface zero, but by setting the component in the direction tangential to the spherical surface as the velocity of the spherical surface In addition to the condition that the velocity of the gas flowing into the spatial part and the velocity thereof discharged therefrom are uniform, a velocity distribution and an air current turbulence condition may be added to the inflow velocity as a component, according to a simulation condition. In the case where the area of the extracted spherical surface is sufficiently wide, the initial inflow velocity $v_1$ may be made uniform. In the case where the outflow velocity is used as the inflow velocity in a subsequent computation in consideration of the influence of the spherical surface on the air when the air passes through the spatial part, the following relationship may be established: the outflow velocity $v_n = v_n - 1$ (n is computing number of times) may be established. To increase the computation efficiency, as shown in FIG. 13, let the spherical surface 22 be a flat surface 22'. In this case, the conversion which is made in the equations (6) and (7) may be omitted.

As apparent from the foregoing description, for each concavity or for a certain group of concavities formed on the surface of a sphere, the use of the gas flow simulation method of the present invention allows visual evaluation of the change of the gas flow which occurs owing to the formation of the concavity. That is, in the program of the gas flow simulation method, it is possible to create various kinds of size of the concavity, the configuration thereof, and the arrangement thereof on a computer. Thus it is possible to objectively determine how the newly created concavity affect the gas current on the periphery of the concavity. Accordingly it is possible to clearly recognize the casual relationship between the concavity and the gas flow and design the concavity without relying on values based on experiments and experiences unlike the conventional method. Thereby by applying the present invention to the design of the dimple, it is possible to evaluate the effect of the dimple correctly and objectively. It is possible to develop the golf ball efficiently by reflecting the results thus obtained on the design of the dimple.

It is also possible to set various conditions of the gas flow. Therefore it is possible to perform simulations in consideration of every condition. Compared with experiments which are conventionally made by generating wind in a wind tunnel, it is possible to accomplish evaluations for much more conditions in a shorter period of time. Further how the concavity affects the gas flow on the periphery thereof is evaluated by only the simulation which is made on the computer. Thus the present invention eliminates the need for conducting experiments by making many kinds of golf balls having different dimple specifications on an experimental basis. Accordingly it is possible to reduce much time and expense for the development of the golf ball.

The invention claimed is:

1. A gas flow simulation method comprising:
   forming an object having at least one concavity on a surface thereof by a computer and extracting a part of said surface of said object including said concavity;

forming a spatial part from a space located on a periphery of said object in contact with said extracted surface of said object;

dividing said spatial part into a plurality of lattice-shaped portions;

flowing a gas into said spatial part in one direction along said surface of said object and discharging said gas in a different direction through an inside of said spatial part;

computing a motion element of a flow of said gas for each lattice-shaped portion of said spatial part; and simulating a flow of said gas on the periphery of said concavity, wherein a height of each of said lattice-shaped portions located in a range less than $1/Re^{0.5}$ (Re is Reynolds number, Re=representative velocity×representative length/kinematic viscosity of gas) with respect to said surface of said object is set to not less than $1/(1000\cdot Re^{0.5})$ nor more than $1/Re^{0.5}$, and said height of each of said lattice-shaped portions located in a range not less than $1/Re^{0.5}$ with respect to said surface of said object is set to not less than $1/Re^{0.5}$.

2. The gas flow simulation method according to claim 1, wherein said motion element of said gas flow is a velocity of said gas flow, a direction of said gas flow, and a pressure of said gas flow applied to said surface of said object in each axial direction of a three-dimensional space coordinate system, and said motion element is computed at each slight time dt by using the equation of continuity and the Navier-Stokes equation.

3. The gas flow simulation method according to claim 1, wherein based on a result of said computation, a gas flow on the periphery of said concavity is simulated by visualizing a flow direction of said gas flow and a flow velocity thereof by a vector direction and a vector length respectively.

4. The gas flow simulation method according to claim 1, wherein based on a result of said computation, a gas flow on the periphery of said concavity is simulated by visualizing a pressure distribution of said gas flow by an isobaric line or a surface connecting equal pressures to each other.

5. The gas flow simulation method according to claim 1, wherein based on a result of said computation, a gas flow on the periphery of said concavity is simulated by visualizing a vorticity distribution of said gas flow by an isopleth of equal vorticities or a surface connecting equal vorticities to each other.

6. The gas flow simulation method according to claim 1, wherein based on a result of said computation, a gas flow on the periphery of said concavity is simulated by visualizing a stream line, a trajectory, and a particle trace of said gas flow.

7. The gas flow simulation method according to claim 1, wherein a height of said spatial part with respect to said surface of said object is set to more than 10 times as large as a depth of said concavity nor more than 10000 times as large as said depth thereof.

8. The gas flow simulation method according to claim 1, wherein said surface of said object is curved, and a flow direction of said gas which flows into said spatial part and discharged therefrom is corrected in conformity to a curvature of said surface of said object.

9. The gas flow simulation method according to claim 1, wherein said object is a golf ball, said concavity is a dimple, and a flow of a gas on the periphery of said dimple of said golf ball is simulated.

10. The gas flow simulation method according to claim 1, wherein the height of the lattice-shaped portions gradually increases from the surface of the object to a height of the spatial part.

11. The gas flow simulation method according to claim 1, wherein dividing the spatial part into a plurality of lattice-shaped portions further comprises dividing the spatial part into the plurality of the lattice-shaped portions combined with any combination of trigonal pyramid shaped portions, quadrangular pyramid shaped portions or trigonal prism shaped portions.

12. A computer program product configured to execute computer instructions, comprising:

a first computer code configured to form an object having at least one concavity on a surface thereof an extract a part of said surface of said object including said concavity;

a second computer code configured to form a spatial part from a space located on a periphery of said object in contact with said extracted surface of said object;

a third computer code configured to divide said spatial part into a plurality of lattice-shaped portions;

a fourth computer code configured to flow a gas into said spatial part in one direction along said surface of said object and to discharge said gas in a different direction through an inside of said spatial part;

a fifth computer code configured to compute a motion element of a flow of said gas for each lattice-shaped portion of said spatial part; and a sixth computer code configured to simulate a flow of said gas on the periphery of said concavity, wherein a height of each of said lattice-shaped portions located in a range less than $1/Re^{0.5}$ (Re is Reynolds number, Re=representative velocity×representative length/kinematic viscosity of gas) with respect to said surface of said object is set to not less than $1/(1000\cdot Re^{0.5})$ nor more than $1/Re^{0.5}$, and said height of each of said lattice-shaped portions located in a range not less than $1/Re^{0.5}$ with respect to said surface of said object is set to not less than $1/Re^{0.5}$.

13. The computer program product according to claim 12, wherein said motion element of said gas flow is a velocity of said gas flow, a direction of said gas flow, and a pressure of said gas flow applied to said surface of said object in each axial direction of a three-dimensional space coordinate system, and said motion element is computed at each slight time dt by using the equation of continuity and the Navier-Stokes equation.

14. The computer program product according to claim 12, wherein based on a result of said computation, a gas flow on the periphery of said concavity is simulated by visualizing a flow direction of said gas flow and a flow velocity thereof by a vector direction and a vector length respectively.

15. The computer program product apparatus according to claim 12, wherein based on a result of said computation by said fifth computer code, a gas flow on the periphery of said concavity is simulated by visualizing a pressure distribution of said gas flow by an isobaric line or a surface connecting equal pressures to each other.

16. The computer program product according to claim 12, wherein based on a result of said computation by said fifth computer code, a gas flow on the periphery of said concavity is simulated by visualizing a vorticity distribution of said gas flow by an isopleth of equal vorticities or a surface connecting equal vorticities to each other.

17. The computer program product according to claim 12, wherein based on a result of said computation by said fifth computer code, a gas flow on the periphery of said concavity is simulated by visualizing a stream line, a trajectory, and a particle trace of said gas flow.

18. The computer program product according to claim 12, wherein a height of said spatial part with respect to said surface of said object is set to more than 10 times as large as a depth of said concavity nor more than 10000 times as large as said depth thereof.

19. The computer program product according to claim 12, wherein said surface of said object is curved, and a flow direction of said gas which flows into said spatial part and discharged therefrom is corrected in conformity to a curvature of said surface of said object.

20. The computer program product according to claim 12, wherein said object is a golf ball, said concavity is a dimple, and a flow of a gas on the periphery of said dimple of said golf ball is simulated.

21. The computer program product according to claim 12, wherein the height of the lattice-shaped portions gradually increases from the surface of the object to a height of the spatial part.

22. The computer program product according to claim 12, wherein third computer code divides the spatial part into the plurality of the lattice-shaped portions combined with any combination of trigonal pyramid shaped portions, quadrangular pyramid shaped portions or trigonal prism shaped portions.

* * * * *